(12) United States Patent
Thakkar et al.

(10) Patent No.: US 11,907,913 B2
(45) Date of Patent: Feb. 20, 2024

(54) MAINTAINING AN AIRCRAFT WITH AUTOMATED ACQUISITION OF REPLACEMENT AIRCRAFT PARTS

(71) Applicant: The Boeing Company, Chicago, IL (US)

(72) Inventors: Rahul C. Thakkar, Leesburg, VA (US); Leontios Christodoulou, Alexandria, VA (US); Surya Pandrangi, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 17/376,805

(22) Filed: Jul. 15, 2021

(65) Prior Publication Data

US 2022/0051198 A1 Feb. 17, 2022

Related U.S. Application Data

(60) Provisional application No. 63/065,065, filed on Aug. 13, 2020.

(51) Int. Cl.
*G06Q 10/20* (2023.01)
*G06Q 10/087* (2023.01)
*G06Q 10/0631* (2023.01)
*G06Q 10/10* (2023.01)
*G06N 20/20* (2019.01)
(Continued)

(52) U.S. Cl.
CPC ............... *G06Q 10/20* (2013.01); *B64F 5/40* (2017.01); *G06F 16/2379* (2019.01); *G06N 20/20* (2019.01); *G06Q 10/06315* (2013.01); *G06Q 10/087* (2013.01); *G06Q 10/10* (2013.01);
(Continued)

(58) Field of Classification Search
None
See application file for complete search history.

(56) References Cited

U.S. PATENT DOCUMENTS 9,031,734 B2 * 5/2015 Froom .................. G01N 29/44
901/44
10,364,049 B2 6/2019 Floyd et al.
(Continued)

OTHER PUBLICATIONS

Delosier "A method for forecasting repair and replacement needs for Naval aircraft phase II", Sep. 1986, Oak Ridge National Laboratory, pp. 1-51 (Year: 1986).*

*Primary Examiner* — Romain Jeanty
(74) *Attorney, Agent, or Firm* — Quinn IP Law

(57) ABSTRACT

A method is provided for maintaining an aircraft of a type of aircraft. The method includes accessing time series of observations of variables that describe in-service operation of the aircraft, maintenance of the aircraft, and weather and/or terrain in an environment of the aircraft during in-service operation and maintenance. The method includes determining a behavior model that is trained to predict demand for replacement aircraft parts from a training set across a plurality of aircraft of the type of aircraft. The behavior model is implemented as a directed acyclic graph of machine learning models that are connected to one another. The time series are applied to the behavior model to predict the demand for the replacement aircraft parts, a plan is created for acquisition of the replacement aircraft parts and maintenance of the aircraft based on the demand as predicted, and the plan is executed.

20 Claims, 11 Drawing Sheets

(51) Int. Cl.
     *G06F 16/23*      (2019.01)
     *G07C 5/08*      (2006.01)
     *B64F 5/40*      (2017.01)
     *G06Q 30/0601*      (2023.01)
     *G07C 5/00*      (2006.01)

(52) U.S. Cl.
     CPC ......... *G06Q 30/0633* (2013.01); *G07C 5/085* (2013.01); *G07C 5/008* (2013.01)

(56) References Cited

U.S. PATENT DOCUMENTS

| | | | |
|---|---|---|---|
| 2005/0114237 A1* | 5/2005 | Urso | G06Q 10/087 705/28 |
| 2006/0020485 A1* | 1/2006 | Schierholt | G06Q 10/087 705/305 |
| 2006/0293906 A1* | 12/2006 | Wilson | G05B 19/4207 705/305 |
| 2010/0033308 A1* | 2/2010 | Muirhead | H04B 7/18506 340/5.92 |
| 2010/0042283 A1* | 2/2010 | Kell | G06Q 10/0875 705/29 |
| 2017/0283085 A1* | 10/2017 | Kearns | B64F 5/60 |

\* cited by examiner

MAINTAINING AN AIRCRAFT WITH AUTOMATED ACQUISITION OF REPLACEMENT AIRCRAFT PARTS

CROSS-REFERENCE TO RELATED APPLICATION(S)

This application claims priority to U.S. Provisional Application No. 63/065,065, filed Aug. 13, 2020, entitled MAINTAINING AN AIRCRAFT WITH AUTOMATED ACQUISITION OF REPLACEMENT AIRCRAFT PARTS, the content of which is incorporated herein by reference in its entirety.

TECHNOLOGICAL FIELD

The present disclosure relates generally to aircraft maintenance and, in particular, to maintaining an aircraft with automated acquisition of replacement aircraft parts.

BACKGROUND

Maintenance is regularly performed on aircraft to replace aged aircraft parts with replacement aircraft parts to keep the aircraft in a safe condition for in-service operation. Thus, it is desired to predict the demand for the replacement aircraft parts for maintenance during an in-service lifecycle of the aircraft. However, predicting the demand for the replacement aircraft parts is challenging. The relatively small amount of available historic data on aircraft part replacement (especially for a new model of aircraft) creates one challenge for predicting the demand for replacement aircraft parts. Also, many aged aircraft parts removed from aircraft that have been retired from service are reconditioned and sold as replacement aircraft parts. This adds to the overall pool of available replacement aircraft parts, which reduces the demand for new replacement aircraft parts. The above factors create a nondeterministic environment for predicting the demand for the replacement aircraft parts. Thus, conventional methods of using statistical models may not be effective in predicting the demand for the replacement aircraft parts.

Therefore, it would be desirable to have a system and method that takes into account at least some of the issues discussed above, as well as other possible issues.

BRIEF SUMMARY

Example implementations of the present disclosure are directed to aircraft maintenance and, in particular, to maintaining an aircraft with automated acquisition of replacement aircraft parts. Example implementations determine and use a behavior model to predict demand for replacement aircrafts part from observations of variables that describe in-service operation and maintenance of the aircraft, as well as weather and/or terrain during in-service operation and maintenance of the aircraft. The behavior model may be implemented as a directed acyclic graph of machine learning models that are connected to one another to provide a more accurate prediction based on the multiple variables. A plan for acquisition of the replacement aircraft parts and maintenance of the aircraft may be created and executed to maintain the aircraft, which may include automated acquisition of one or more of the replacement aircraft parts.

The present disclosure thus includes, without limitation, the following example implementations.

Some example implementations provide a method of maintaining an aircraft from a plurality of aircraft of a type of aircraft that includes a plurality of aircraft parts, the method comprising accessing a first time series of observations of first variables that describe in-service operation of the aircraft, including for a plurality of flights of the aircraft, flight plans, and geographic locations, operational context and status of the aircraft; accessing a second time series of observations of second variables that describe maintenance of the aircraft, including a maintenance history of the aircraft, historical orders of replacement aircraft parts for respective aircraft parts of the plurality of aircraft parts, and historical time to replace the respective aircraft parts with the replacement aircraft parts; accessing a third time series of observations of third variables that describe at least one of weather or terrain in an environment of the aircraft during the in-service operation and the maintenance of the aircraft; determining a behavior model of the type of aircraft that is trained to predict demand for the replacement aircraft parts from a training set of observations the first variables, the second variables and the third variables across the plurality of aircraft of the type of aircraft, the behavior model implemented as a directed acyclic graph of machine learning models that are connected to one another, an output of a first of the machine learning models fed to as input to a second of the machine learning models; applying the first time series, the second time series and the third time series to the behavior model to predict the demand for the replacement aircraft parts; creating a plan for acquisition of the replacement aircraft parts, and maintenance of the aircraft in which the respective aircraft parts are replaced with the replacement aircraft parts, based on the demand as predicted; and executing the plan to maintain the aircraft.

In some example implementations of the method of any preceding example implementation, or any combination of any preceding example implementations, the operational context of the aircraft for a flight of the aircraft is defined by one or more of the first variables that characterize a situation of the aircraft during the flight, including a type of the flight as a solo flight or a coordinated flight with multiple aircraft, and when the flight is the coordinated flight, a position of the aircraft in a formation of the multiple aircraft.

In some example implementations of the method of any preceding example implementation, or any combination of any preceding example implementations, the operational context of the aircraft for a flight of the aircraft is defined by one or more of the first variables that characterize a situation of the aircraft during the flight, including a use of flight controls to operate the aircraft during the flight, and a use of aircraft systems driven by the use of the flight controls.

In some example implementations of the method of any preceding example implementation, or any combination of any preceding example implementations, the method further comprises storing the first time series, the second time series and the third time series in one or more data stores continuously and contemporaneous with the in-service operation and the maintenance of the aircraft, the one or more data stores including one or more of a time-series data warehouse, an object storage system, a document storage system, a distributed file system, a disk file system, a distributed data storage, or a database management system, and wherein the first time series, the second time series and the third time series are accessed from the one or more data stores.

In some example implementations of the method of any preceding example implementation, or any combination of any preceding example implementations, storing one or more of the first time series, the second time series or the third time series includes digitizing printed documents to produce corresponding electronic documents; extracting data from the corresponding electronic documents; and formatting the data into observations of one or more of the first time series, the second time series or the third time series.

In some example implementations of the method of any preceding example implementation, or any combination of any preceding example implementations, the behavior model is determined from the training set of the observations of the first variables, the second variables and the third variables across the plurality of aircraft of the type of aircraft, and further across a plurality of types of aircraft.

In some example implementations of the method of any preceding example implementation, or any combination of any preceding example implementations, creating the plan includes for a replacement aircraft part determining the replacement aircraft part is out-of-stock part or an out-of-production part; and identifying a manufacturer for the replacement aircraft part as a make-to-order part, and wherein executing the plan includes placing an automated order for the replacement aircraft part from the manufacturer.

In some example implementations of the method of any preceding example implementation, or any combination of any preceding example implementations, executing the plan includes collecting additional observations of the first variables, the second variables and the third variables; and feeding the additional observations of the first variables, the second variables and the third variables back to the training set to further train the behavior model.

Some example implementations provide an apparatus for maintaining an aircraft from a plurality of aircraft of a type of aircraft that includes a plurality of aircraft parts, the apparatus comprising: a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for maintaining an aircraft from a plurality of aircraft of a type of aircraft that includes a plurality of aircraft parts, the computer-readable storage medium being non-transitory and having computer-readable program code stored therein that, in response to execution by processing circuitry, causes an apparatus to at least perform the method of any preceding example implementation, or any combination of any preceding example implementations.

Some example implementations provide a method of automated acquisition of a replacement aircraft part to replace an aircraft part of an aircraft, the method implemented by a computer and comprising determining a demand for the replacement aircraft part; determining the replacement aircraft part is an out-of-stock part or an out-of-production part; determining the replacement aircraft part is manufacturable as a make-to-order part in compliance with regulations to which the aircraft is subject, and that is certifiable for use on the aircraft; identifying a plurality of manufacturers authorized to manufacture and certify the replacement aircraft part; submitting a request for proposal for the replacement aircraft part to the plurality of manufacturers; receiving responses to the request for proposal from the plurality of manufacturers; identifying a manufacturer for the replacement aircraft part based on the responses; placing an automated order for the replacement aircraft part from the manufacturer; receiving the replacement aircraft part from the manufacturer, the replacement aircraft part manufactured in compliance with the regulations and certified; and replacing the aircraft part with the replacement aircraft part on the aircraft.

In some example implementations of the method of any preceding example implementation, or any combination of any preceding example implementations, the aircraft is from a plurality of aircraft of a type of aircraft, and determining the demand for the replacement aircraft part includes accessing a first time series of observations of first variables that describe in-service operation of the aircraft, a second time series of observations of second variables that describe maintenance of the aircraft, and a third time series of observations of third variables that describe at least one of weather or terrain in an environment of the aircraft during the in-service operation and the maintenance of the aircraft; determining a behavior model of the type of aircraft that is trained to predict the demand for the replacement aircraft part from a training set of observations the first variables, the second variables and the third variables across the plurality of aircraft of the type of aircraft, the behavior model implemented as a directed acyclic graph of machine learning models that are connected to one another, an output of a first of the machine learning models fed to as input to a second of the machine learning models; and applying the first time series, the second time series and the third time series to the behavior model to predict the demand for the replacement aircraft part.

Some example implementations provide an apparatus for automated acquisition of a replacement aircraft part to replace an aircraft part of an aircraft, the apparatus comprising: a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for automated acquisition of a replacement aircraft part to replace an aircraft part of an aircraft, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
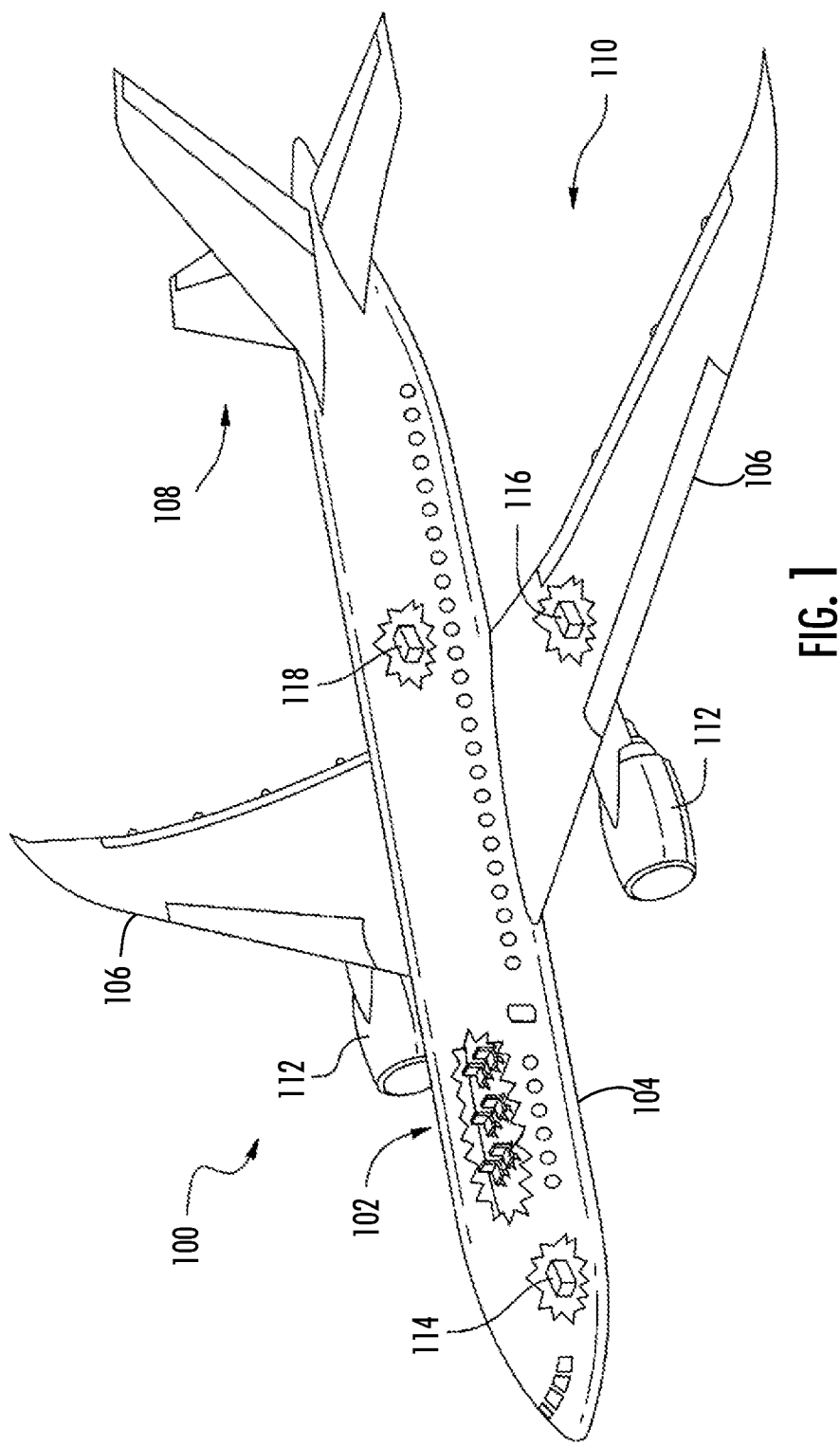
FIG. 1 illustrates an aircraft according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," "observation" and similar terms may be at times used interchangeably.

Example implementations of the present disclosure relate generally to aircraft maintenance and, in particular, to maintaining an aircraft with automated acquisition of replacement aircraft parts. Example implementations will be primarily described in conjunction with aircraft, but it should be understood that example implementations may be utilized in conjunction with a variety of other vehicles. Examples of suitable vehicles that may benefit from example implementations include spacecraft, watercraft, motor vehicles, railed vehicles and the like.

Example implementations of the present disclosure address a number of challenges, including prediction of demand for replacement aircraft parts using data collected in a number of different forms, both manually and automatically. The properties and life cycle of aircraft parts may be tracked for an aircraft, which may be extended across a plurality of aircraft, a type of aircraft, or a plurality of types of aircraft. The type of aircraft may be expressed in any of a number of different manners, including by manufacturer, model or the like. Other relevant data may also be collected including, for example, geographically where each aircraft is located, where the aircraft travels, how much the aircraft is used, measured wear and tear on the aircraft, past data about the type of aircraft.

Examples of relevant data may also include weather and terrain considerations—as in what is the typical weather in the geographic locations where the aircraft spends its time on ground, the weather during the time it spends in air, and the like. In a particular example, consider an aircraft that primarily operates in a desert region with high ambient temperatures, no moisture and winds with fine sand. That aircraft may wear off sooner than a comparable aircraft that primarily operates in a temperate weather with some humidity. An aircraft may operate in a very cold environment, or from a very hot to a very cold ground environment.

Data about the aircraft parts and how those parts are made may be known. Best guess predictions on the mean time between failure (MTBF) may also be known, although these predictions often cannot be confirmed with certainty over time—for a given surrounding, a given form of use.

Example implementations of the present disclosure collect or otherwise access time series of observations of variables that describe in-service operation and maintenance of an aircraft. This may include variables that describe utilization and/or logistics of an aircraft, utilization and/or logistics of aircraft parts of a given type of an aircraft, maintenance history of an aircraft, part data for aircraft parts that failed, MTBF data for aircraft parts, the time to replace aircraft parts with replacement aircraft parts, cost and availability of aircraft parts or replacement aircraft parts, weather and/or terrain in an environment of the aircraft, and the like. The observations may include those for a particular aircraft, type of aircraft, plurality of aircraft or type of aircraft, or a plurality of types of aircraft.

The variables may be used to determine a behavior model of the aircraft or type of aircraft, trained to predict demand for replacement aircraft parts. The behavior model may be built using a plurality of machine learning models that may be arranged plug-and-play into the behavior model. Some example implementations may deliver the machine learning models via a development platform that enables the behavior model. In some examples, the behavior model is implemented as a directed acyclic graph (DAG) in which the machine learning models are nodes connected to one another, an output of a first of the machine learning models fed to as input to a second of the machine learning models. The machine learning models in the DAG take one or more inputs and output data for the behavior model or a next of the machine learning models.

Example implementations apply the time series of observations of the variables to the behavior model to predict demand for a replacement aircraft part or multiple replacement aircraft parts for aircraft parts that may be independent of one another or interrelated in some manner. In this regard, aircraft parts may be interrelated in that the aircraft parts are on the same aircraft or part of a potential cascade of failures, such as a failure in a temperature gauge causing a downstream part being overheated and failing. A plan for acquisition of the replacement aircraft part(s) may then be created and executed. In some examples, this includes acquisition of the replacement aircraft part(s). This may include the automated placement of an order for a replacement aircraft part without human intervention. And because the demand is predicted, the replacement aircraft part(s) may be acquired before they are needed, with example implementations able to anticipate lead time and minimize ground time and inventory stocking time.

FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other example implementations, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
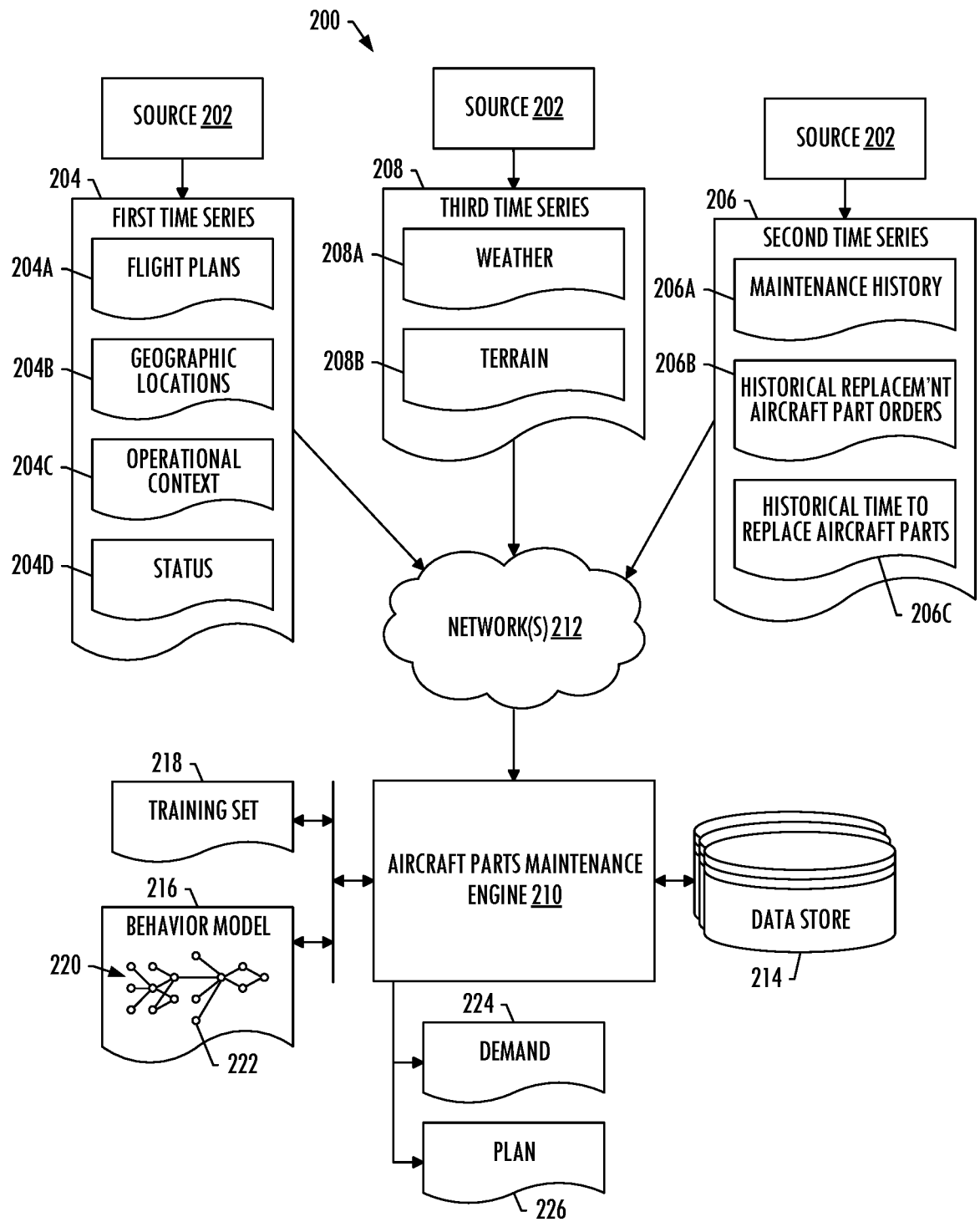
FIG. 2 illustrates a system for maintaining an aircraft from a plurality of aircraft of a type of aircraft that includes a plurality of aircraft parts, according to some example implementations.

FIG. 2 illustrates a system 200 for maintaining an aircraft (e.g., aircraft 100) from a plurality of aircraft of a type of aircraft that includes a plurality of aircraft parts, according to some example implementations. The system may include any of a number of different subsystems (each an individual system) for performing one or more functions or operations. As shown, in some examples, the system includes at least one source 202 of data. In some examples, the source includes a memory that may be located at a single source or distributed across multiple sources. The data may be stored in a number of different manners, such as in a database or flat files of any of a number of different types or formats.

In some examples, the data includes a first time series 204, a second time series 206 and a third time series 208 of observations of respectively first variables, second variables and third variables. The first time series of observations of first variables describe in-service operation of the aircraft. In some examples, the first time series includes, for a plurality of flights of the aircraft, flight plans 204A, and geographic locations 204B, operational context 204C and status 204D of the aircraft. The flight plans may include either or both original flight plans or executed flight plans of the aircraft. In some examples, the operational context of the aircraft for a flight is defined by one or more of the first variables that characterize a situation of the aircraft during the flight, including a type of the flight as a solo flight or a coordinated flight with multiple aircraft, and when the flight is the coordinated flight, a position of the aircraft in a formation of the multiple aircraft. Additionally or alternatively, in some examples, the one or more of the first variables that define the operational context of the aircraft for a flight characterize a situation of the aircraft during the flight, including a use of flight controls to operate the aircraft during the flight, and a use of aircraft systems driven by the use of the flight controls. In this regard, the operational context may characterize, for example, the flight is a civilian flight, military or combat flight, short flight, long-haul flight.

The second time series 206 of observations of second variables describe maintenance of the aircraft. In some examples, the second time series includes a maintenance history 206A of the aircraft, historical orders 206B of replacement aircraft parts for respective aircraft parts of the plurality of aircraft parts, and historical time to replace 206C the respective aircraft parts with the replacement aircraft parts. The third time series 208 of observations of third variables describe at least one of weather 208A or terrain 208B in an environment of the aircraft during the in-service operation and the maintenance of the aircraft.

The system 200 of example implementations of the present disclosure includes an aircraft parts maintenance engine 210 generally configured to create and execute a plan for acquisition of replacement aircraft parts, and maintenance of the aircraft in which the respective aircraft parts are replaced with the replacement aircraft parts. The at least one source 202 of data and the aircraft parts maintenance engine may be co-located or directly coupled to one another, or in some examples, the source and aircraft parts maintenance engine may communicate with one another across one or more computer networks 212. Further, although shown as part of the system, it should be understood that any one or more of the above may function or operate as a separate system without regard to any of the other subsystems. It should also be understood that the system may include one or more additional or alternative subsystems than those shown in FIG. 2.

In some examples, the aircraft parts maintenance engine 210 may be implemented as a platform of micro-services or application programming interfaces (APIs) configured to perform various forms of query and learning and inference and recommendation on observations of the first, second and third variables from the at least one source 202. These micro-services or APIs may be utilized to implement application programs (apps), mobile apps, either as thick client software applications or web apps that use a conventional browser. In autonomous systems, the micro-services or APIs may be directed used by registered and secured autonomous devices to directly communicate information into the implementation.

According to some example implementations of the present disclosure, the aircraft parts maintenance engine 210 is configured to access the first time series 204, the second time series 206 and the third time series 208. In some examples, the aircraft parts maintenance engine is configured to access the first time series, the second time series and the third time series from the at least one source 202. In some examples, the aircraft parts maintenance engine is configured to store the first time series, the second time series and the third time series in one or more data stores 214 from which the respective time series may be accessed. Examples of suitable data stores include one or more of a time-series data warehouse, an object storage system, a document storage system, a distributed file system, a disk file system, a distributed data storage, or a database management system.

In some examples, the aircraft parts maintenance engine 210 is configured to store the first time series, the second time series and the third time series continuously and contemporaneous with the in-service operation and the maintenance of the aircraft. And in some examples, the aircraft parts maintenance engine is configured to digitize printed documents to produce corresponding electronic documents, extract data from the corresponding electronic documents, and format the data into observations of one or more of the first time series, the second time series or the third time series.

Consider a situation in which digital data is not available about an aircraft part, which may be the case for older types of aircraft that are not equipped with sensors capable of reporting such data. Failure data and other relevant data may be captured using printed documents during regular or unscheduled maintenance cycles or when the aircraft or one of its systems reports an error. According to example implementations, these printed documents may be digitized and formatted into observations usable by the aircraft parts maintenance engine 210, such as by image scanning optical character recognition (OCR) and data formatting operations.

The operations to convert printed documents into observations of a time series may be automated with a high degree of accuracy. Errors may be reported and corrected using human intervention by way of oversight, which may then be considered within a machine learning model, similar to a tensor flow model. Using OCR, computer vision, machine learning and the like, the aircraft parts maintenance engine 210 may also provide the oversight personnel with a recommendation regarding at least some errors. The aircraft parts maintenance engine may therefore be configured to self-correct certain observations, improving the quality of data used by the aircraft parts maintenance engine.

The aircraft parts maintenance engine 210 is configured to determine a behavior model 216 of the type of aircraft. The behavior model is trained to predict demand for the replacement aircraft parts from a training set 218 of observations the first variables, the second variables and the third variables across the plurality of aircraft of the type of aircraft; and in some examples, further across a plurality of types of aircraft. In some examples, the behavior model is implemented as a directed acyclic graph (DAG) 220 of machine learning models 222 that are connected to one another, and in which an output of a first of the machine learning models fed to as input to a second of the machine learning models.

The DAG 220 of machine learning models 222 may be determined in a number of different manners. In some examples, the machine learning models may include at least one first machine learning model trained to predict demand for the replacement aircraft parts from the first variables that describe in-service operation of the aircraft, which may be output to at least one second machine learning model. The at least one second machine learning model may be trained to predict the demand for the replacement aircraft parts further from the second variables that describe maintenance of the aircraft, and output the demand (based on the first and second variables) to at least one third machine learning model. And the at least one third machine learning model may be trained to predict the demand for the replacement aircraft parts further from the third variables that describe weather and/or terrain in an environment of the aircraft during in-service operation and maintenance. An output of the at least one third machine learning model, then, may be the demand based on the first, second and third variables.

The aircraft parts maintenance engine 210 is configured to apply the first time series 204, the second time series 206 and the third time series 208 to the behavior model 216 to predict the demand 224 for the replacement aircraft parts. The aircraft parts maintenance engine is configured to create a plan 226 for acquisition of the replacement aircraft parts, and maintenance of the aircraft in which the respective aircraft parts are replaced with the replacement aircraft parts, based on the demand as predicted. And the aircraft parts maintenance engine is configured to execute the plan to maintain the aircraft. As appropriate the aircraft parts maintenance engine may be configured to generate a visual presentation of either or both the demand or the plan to maintenance of the aircraft.

In some examples, execution of the plan 226 includes the aircraft parts maintenance engine 210 configured to collect additional observations of the first variables, the second variables and the third variables. In some of these examples, the aircraft parts maintenance engine is configured to feed the additional observations of the first variables, the second variables and the third variables back to the training set 218 to further train the behavior model 216.

In some examples, creation of the plan 226 includes the aircraft parts maintenance engine 210 configured to determine a replacement aircraft part is out-of-stock part or an out-of-production part. In some of these examples, the aircraft parts maintenance engine is configured to identify a manufacturer for the replacement aircraft part as a make-to-order part. In this regard, the replacement aircraft part may be manufacturable in any of a number of different manners, including according to an additive manufacturing (i.e., 3D printing) process, a machining process such as subtractive manufacturing, or the like. Execution of the plan, then, includes the aircraft parts maintenance engine configured to place an automated order for the replacement aircraft part from the manufacturer.

In some further examples, as demand for replacement aircraft parts is predicted, and the replacement aircraft parts are ordered from manufacturers, the aircraft parts maintenance engine 210 may be configured to determine a further machine learning model for the machine learning models 222 in the DAG 220 for the behavior model 216. Aircraft parts for an aircraft or type of aircraft may be related, and aircraft parts may have dependencies such that failure of a first aircraft part leads to failure of a second aircraft part. By tracking the order behavior, from aircraft that need an aircraft part to manufacturers of replacement aircraft parts, the further machine learning model in the DAG may further improve the behavior model with additional intelligence.

Further to the above example, as the first aircraft part is replaced, the second aircraft part will eventually need replacement, and a dependency graph may be determined to capture this relationship. Another form of the same graph may incorporate not just aircraft parts as nodes in the graph, but also the environment in which failures of the aircraft parts occurred. In some examples, then, the dependency graph may be a multi-modal graph that captures the circumstance of failure as well as dependency on one or more aircraft parts down the chain. This data may also feed into the behavior model 216 for an even further improvement.

Figure 3:
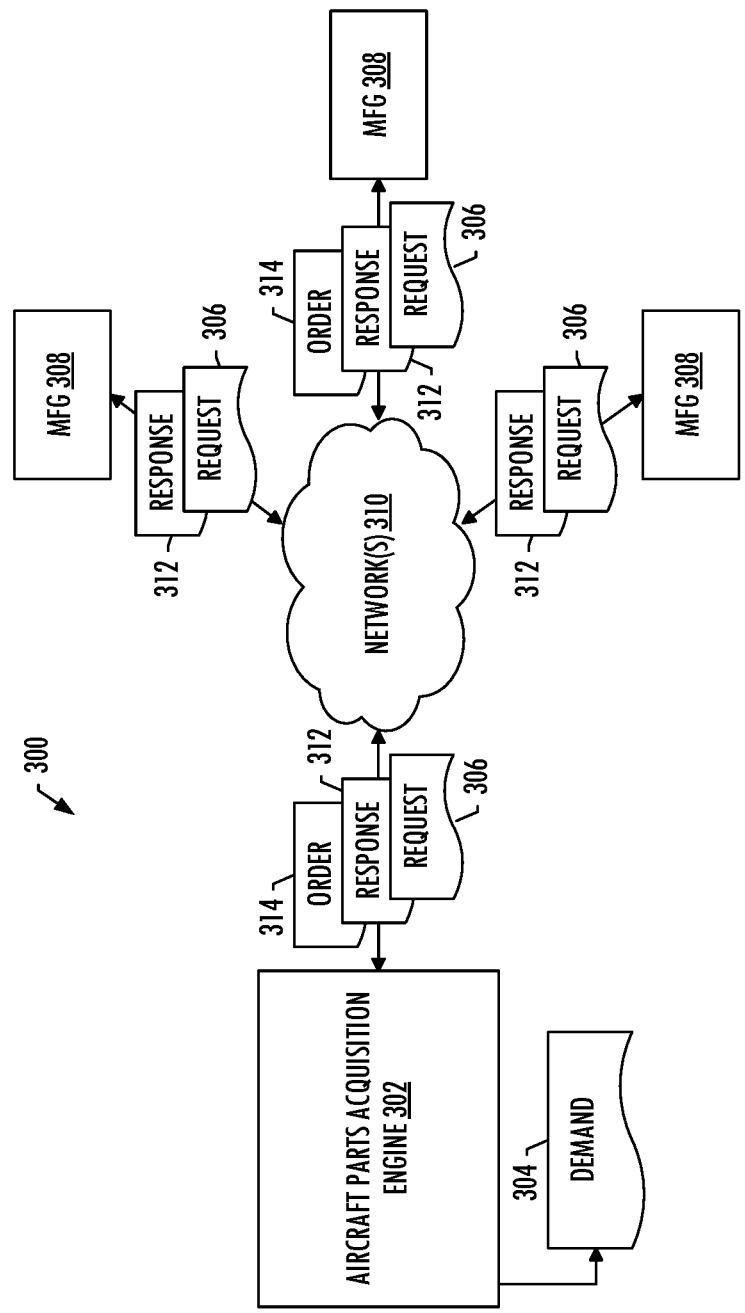
FIGS. 3 and 4 illustrate systems for automated acquisition of a replacement aircraft part to replace an aircraft part of an aircraft, according to some example implementations.
Figure 4:
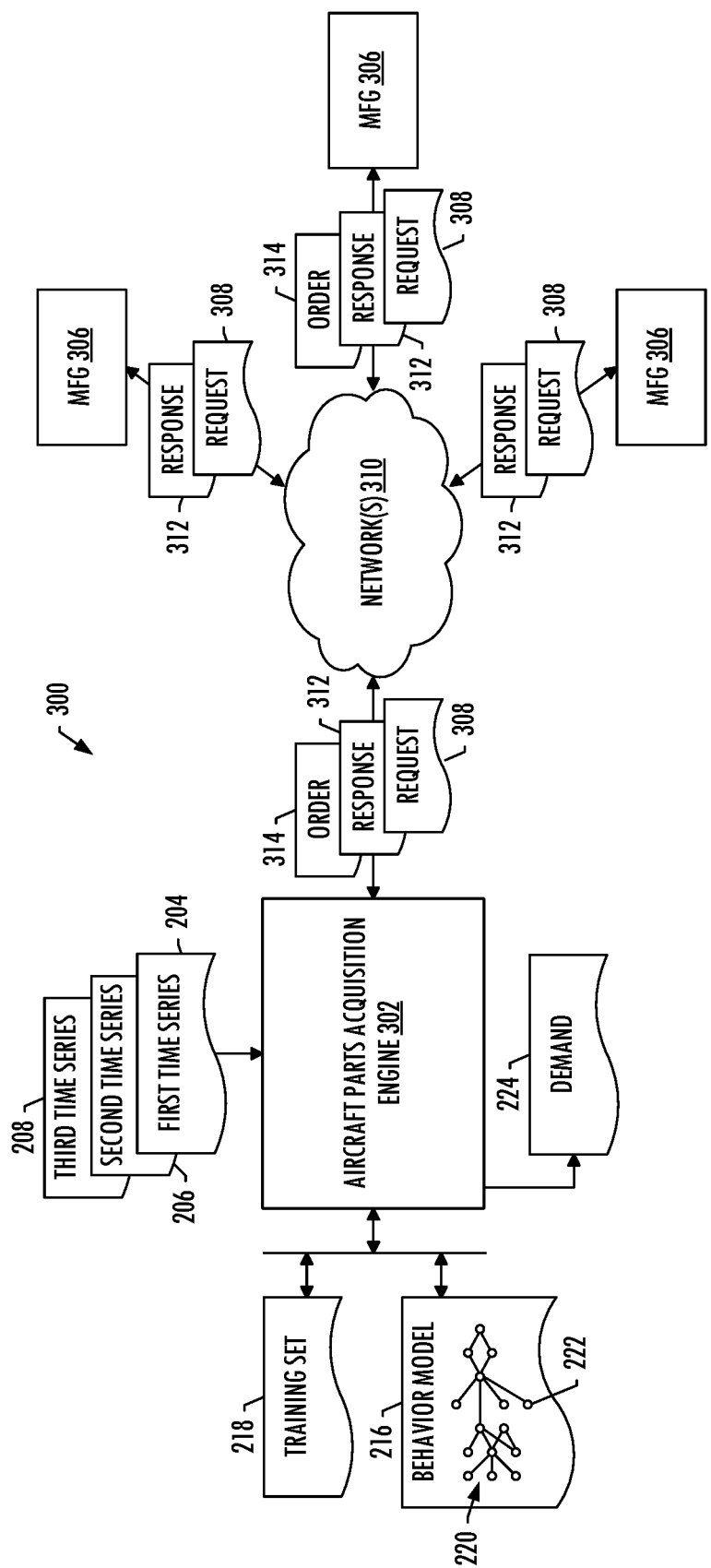

FIG. 3 illustrates a system 300 for automated acquisition of a replacement aircraft part to replace an aircraft part of an aircraft (e.g., aircraft 100) that may be integrated with or separate from the system 200 shown and described with respect to FIG. 2. In this regard, the system 300 may operate independent of the system 200, as part of the system 200, or in cooperation with the system 200. Similar the system 200, the system 300 may include any of a number of different subsystems (each an individual system) for performing one or more functions or operations. As shown, in some examples, the system includes an aircraft parts acquisition engine 302 that may be integrated with or independent of the aircraft parts maintenance engine 210 of the system 200. The aircraft parts acquisition engine is generally configured to automate acquisition of replacement aircraft parts.

In some examples, the aircraft parts acquisition engine 302 is configured to determine a demand 304 for the replacement aircraft part, and determine the replacement aircraft part is an out-of-stock part or an out-of-production part. The aircraft parts acquisition engine is configured to determine the replacement aircraft part is manufacturable as a make-to-order part in compliance with regulations to which the aircraft is subject, and that is certifiable for use on the aircraft. Again, the replacement aircraft part may be manufacturable in any of a number of different manners, including according to an additive manufacturing process, a machining process such as subtractive manufacturing, or the like.

The aircraft parts acquisition engine 302 is configured to identify a plurality of manufacturers authorized to manufacture and certify the replacement aircraft part, and submit a request 306 for proposal for the replacement aircraft part to manufacturer computers 308 of the plurality of manufacturers, such as across one or more computer networks 310. The aircraft parts acquisition engine is configured to receive responses 312 to the request for proposal from the plurality of manufacturers via the manufacturer computers, identify a manufacturer for the replacement aircraft part based on the responses, and place an automated order 314 for the replacement aircraft part from the manufacturer via their manufacturer computer. The aircraft parts acquisition engine may therefore create a supply chain and inventory pool at a location where the aircraft may be serviced to minimize grounding, and long lead replacement aircraft parts may be ordered well in advance of the demand for the aircraft parts.

The aircraft parts acquisition engine 302 may determine the demand for the replacement aircraft part from the demand 224 predicted by the aircraft parts maintenance engine 210, which may be communicated to the aircraft parts acquisition engine. In some examples in which the aircraft parts acquisition engine is integrated with the aircraft parts maintenance engine 210, the aircraft parts acquisition engine may predict demand in a similar manner as that described above. That is, in some examples, the aircraft parts acquisition engine is configured to access the first time series 204, the second time series 206 and the third time series 208. The aircraft parts acquisition engine is configured to determine the behavior model 216 of the type of aircraft that is trained to predict the demand for the replacement aircraft part from the training set 218, and apply the first time series, the second time series and the third time series to the behavior model to predict the demand 224 for the replacement aircraft part. Again, the behavior model implemented as a DAG 220 of machine learning models 222 that are connected to one another, an output of a first of the machine learning models fed to as input to a second of the machine learning models.

In some example implementations, one or more of the source 202, aircraft parts maintenance engine 210, aircraft parts acquisition engine 302 or manufacturer computers 308 may further include a distributed ledger (DL). In some of these examples, a peer-to-peer network including a plurality of network nodes may be used, and one of the network nodes may correspond or be configured to communicate with the source, aircraft parts maintenance engine, aircraft parts acquisition engine or manufacturer computers. The DL is replicated, shared and synchronized across the network nodes of the peer-to-peer network. The DL is a consensus of replicated, shared and synchronized digital data spread across the network nodes. In some examples, the DL is implemented as a database spread across the nodes, each of which replicates and saves a respective local copy of the DL and independently updates it. The DL and thereby each respective local copy includes immutable entries of digital data, where immutable is defined as unchangeability of the digital data stored in the DL.

The DL may be implemented as a blockchain, which is a continuously growing list of immutable entries (records), called blocks, that are linked and secured using cryptography. Each block in a blockchain may contain a cryptographic hash of a previous block, a timestamp, and transaction data. A blockchain is inherently resistant to modification of the digital data stored in the blockchain. A blockchain may be used as a decentralized, distributed, and public or private permissions based digital ledger for recording data across the network nodes of the peer-to-peer network.

The DL may provide event-level traceability, event-triggered activity, and communicate information about the aircraft, aircraft parts, replacement aircraft parts, demand for the replacement aircraft parts, manufacturers of the replacement aircraft parts, automated orders for the replacement aircraft parts, and the like. In some more particular examples, this may include events that indicate one or more of a manufacturer selected to manufacture a replacement aircraft part, and/or an automated order for the replacement aircraft part. Additionally or alternatively, events may include receipt of the replacement aircraft part, and/or replacement of the aircraft part with the replacement aircraft part.

FIGS. 5A, 5B, 5C, 5D and 5E are flowcharts illustrating various operations in a method 500 of maintaining an aircraft from a plurality of aircraft of a type of aircraft that includes a plurality of aircraft parts, according to some example implementations. As shown at block 502 of FIG. 5A, the method includes accessing a first time series of observations of first variables that describe in-service operation of the aircraft, including for a plurality of flights of the aircraft, flight plans (e.g., original and/or executed flight plans), and geographic locations, operational context and status of the aircraft. In some examples, the operational context of the aircraft for a flight of the aircraft is defined by one or more of the first variables that characterize a situation of the aircraft during the flight, including a type of the flight as a solo flight or a coordinated flight with multiple aircraft, and when the flight is the coordinated flight, a position of the aircraft in a formation of the multiple aircraft. Additionally or alternatively, in some examples, the operational context of the aircraft for a flight of the aircraft is defined by one or more of the first variables that characterize a situation of the aircraft during the flight, including a use of flight controls to operate the aircraft during the flight, and a use of aircraft systems driven by the use of the flight controls.

The method 500 includes accessing a second time series of observations of second variables that describe maintenance of the aircraft, including a maintenance history of the aircraft, historical orders of replacement aircraft parts for respective aircraft parts of the plurality of aircraft parts, and historical time to replace the respective aircraft parts with the replacement aircraft parts, as shown at block 504. The method also includes accessing a third time series of observations of third variables that describe at least one of weather or terrain in an environment of the aircraft during the in-service operation and the maintenance of the aircraft, as shown at block 506.

As shown at block 508, the method 500 includes a behavior model of the type of aircraft that is trained to predict demand for the replacement aircraft parts from a training set of observations the first variables, the second variables and the third variables across the plurality of aircraft of the type of aircraft. The behavior model is implemented as a DAG of machine learning models that are connected to one another, with an output of a first of the machine learning models fed to as input to a second of the machine learning models.

In some examples, the behavior model is determined at block 508 from the training set of the observations of the first variables, the second variables and the third variables across the plurality of aircraft of the type of aircraft, and further across a plurality of types of aircraft.

The first time series, the second time series and the third time series are applied to the behavior model to predict the demand for the replacement aircraft parts, as shown at block 510. A plan is created for acquisition of the replacement aircraft parts, and maintenance of the aircraft in which the respective aircraft parts are replaced with the replacement aircraft parts, based on the demand as predicted, as shown at block 512. And the plan is executed to maintain the aircraft, as shown at block 514.

Figure 5A:
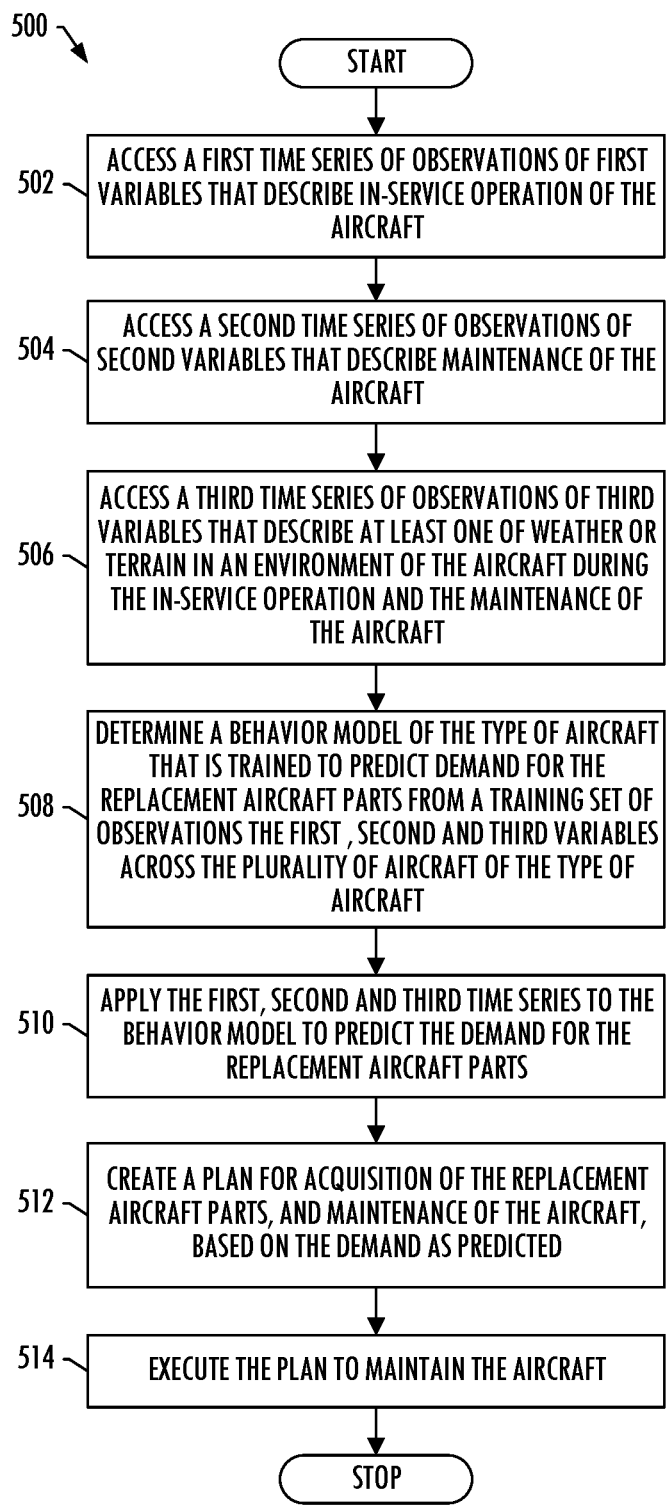
FIGS. 5A, 5B, 5C, 5D and 5E are flowcharts illustrating various operations in a method of maintaining an aircraft from a plurality of aircraft of a type of aircraft that includes a plurality of aircraft parts, according to some example implementations.
Figure 5B:
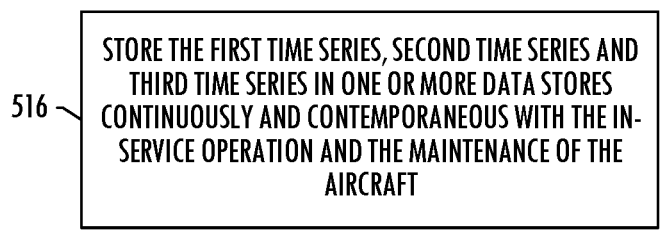

In some examples, the method 500 further includes storing the first time series, the second time series and the third time series in one or more data stores continuously and contemporaneous with the in-service operation and the maintenance of the aircraft, as shown at block 516 of FIG. 5B. In this regard, the one or more data stores include one or more of a time-series data warehouse, an object storage system, a document storage system, a distributed file system, a disk file system, a distributed data storage, or a database management system. In some of these examples, the first time series, the second time series and the third time series are accessed at blocks 502, 504, 506 from the one or more data stores.

Figure 5C:
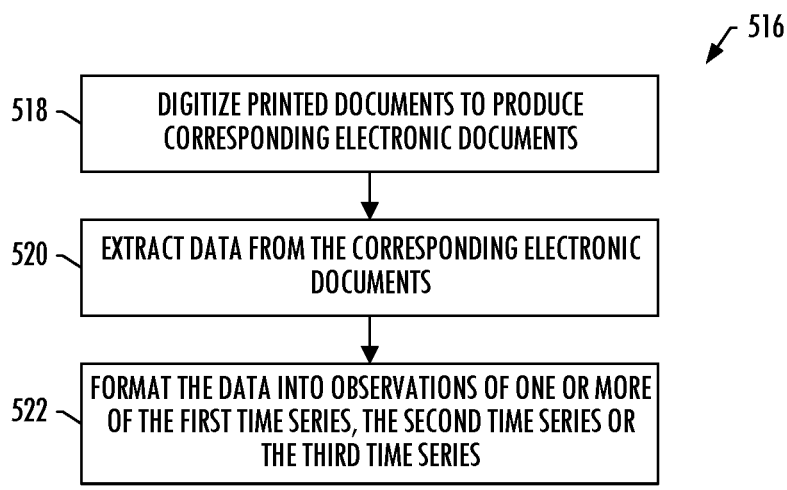

Turning now to FIG. 5C, in some examples, storing one or more of the first time series, the second time series or the third time series at block 516 includes digitizing printed documents to produce corresponding electronic documents, as shown at block 518. Data is from the corresponding electronic documents is extracted, and the data is formatted into observations of one or more of the first time series, the second time series or the third time series, as shown at blocks 520 and 522.

Figure 5D:
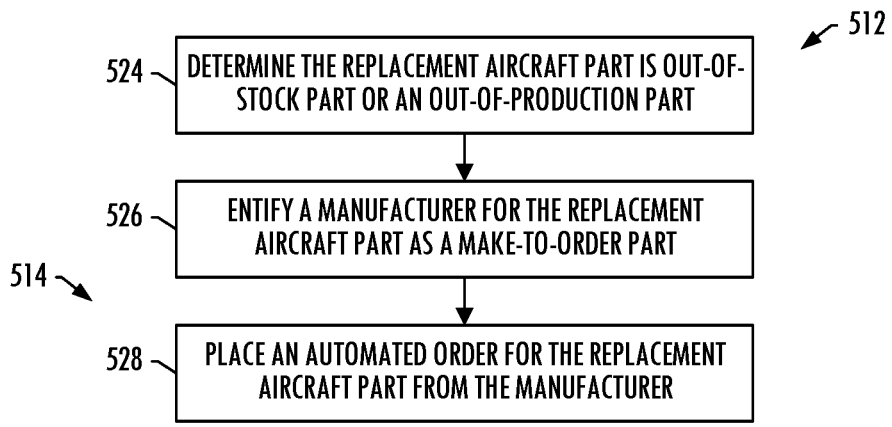

As shown at blocks 524 and 526 of FIG. 5D, in some examples, creating the plan at block 512 includes for a replacement aircraft part, determining the replacement aircraft part is out-of-stock part or an out-of-production part, and identifying a manufacturer for the replacement aircraft part as a make-to-order part. In some of these examples, executing the plan at block 514 includes placing an automated order for the replacement aircraft part from the manufacturer, as shown at block 528.

Figure 5E:
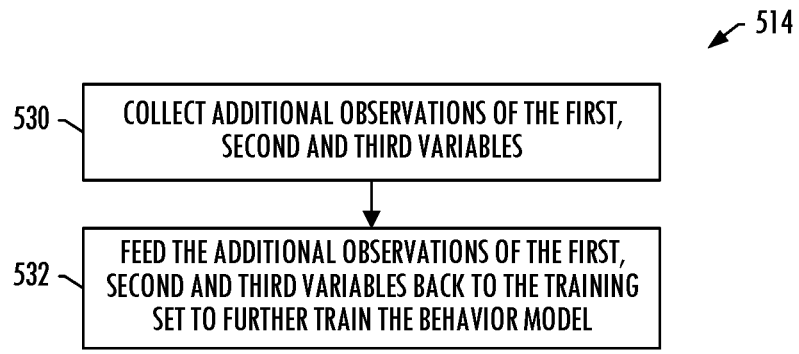

In some examples, executing the plan at block 514 includes collecting additional observations of the first variables, the second variables and the third variables, as shown at block 530 of FIG. 5E. In some of these examples, the additional observations of the first variables, the second variables and the third variables are fed back to the training set to further train the behavior model, as shown at block 532.

Figure 6A:
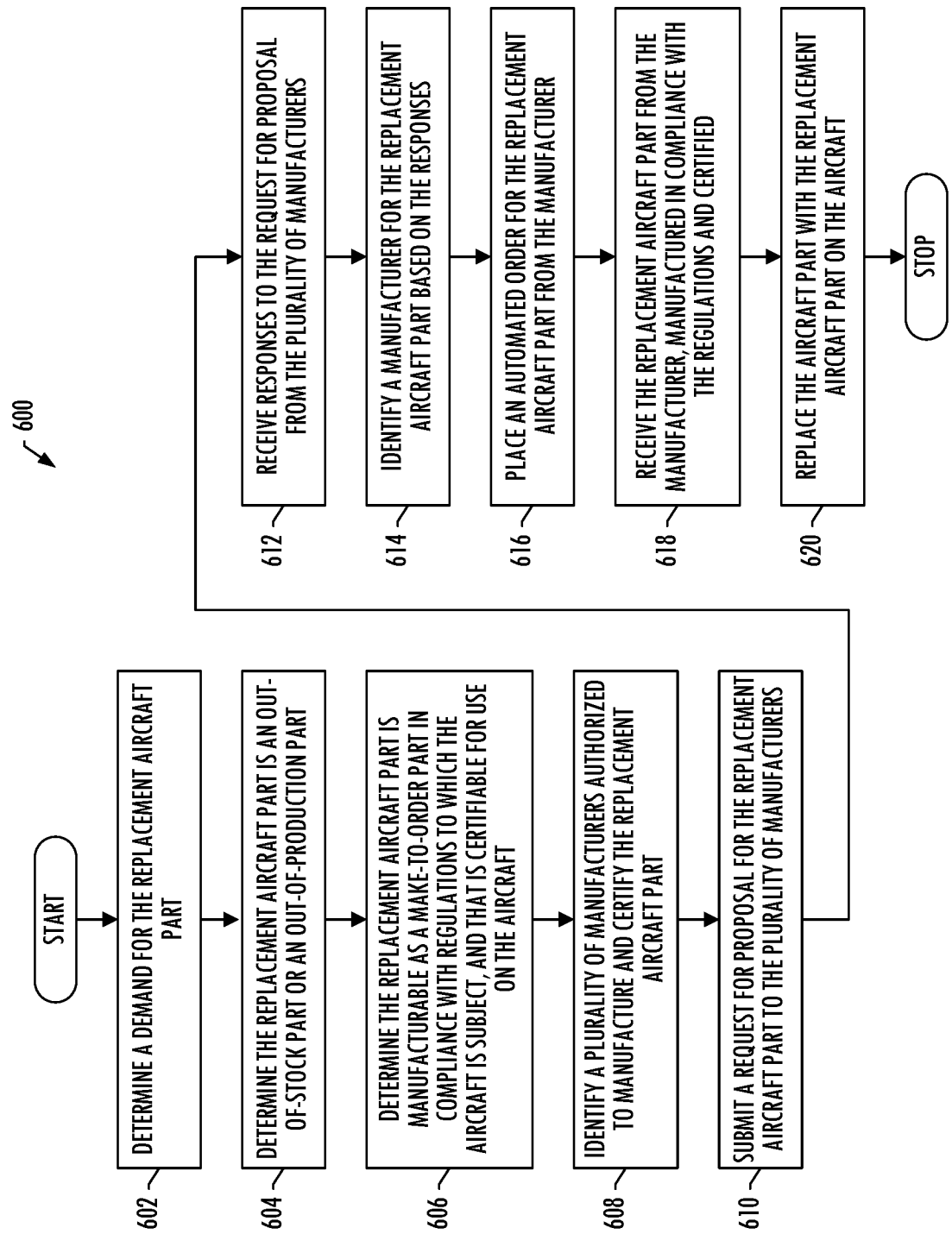
FIGS. 6A and 6B are flowcharts illustrating various operations in a method of automated acquisition of a replacement aircraft part to replace an aircraft part of an aircraft, according to some example implementations.
Figure 6B:
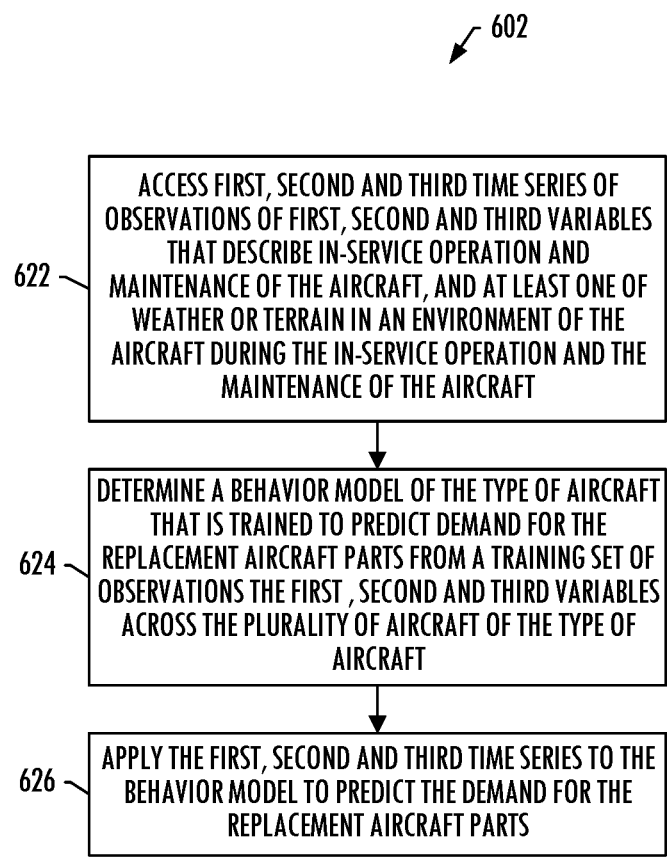

FIGS. 6A and 6B are flowcharts illustrating various operations in a method 600 of automated acquisition of a replacement aircraft part to replace an aircraft part of an aircraft, according to some example implementations. The method includes determining a demand for the replacement aircraft part, and determining the replacement aircraft part is an out-of-stock part or an out-of-production part, as shown at blocks 602 and 604 of FIG. 6A. The method includes determining the replacement aircraft part is manufacturable as a make-to-order part in compliance with regulations to which the aircraft is subject, and that is certifiable for use on the aircraft, as shown at block 606.

As shown at blocks 608 and 610, the method 600 includes identifying a plurality of manufacturers authorized to manufacture and certify the replacement aircraft part, and submitting a request for proposal for the replacement aircraft part to the plurality of manufacturers. The method includes receiving responses to the request for proposal from the plurality of manufacturers, and identifying a manufacturer for the replacement aircraft part based on the responses, as shown at blocks 612 and 614. An automated order is placed for the replacement aircraft part from the manufacturer, and the replacement aircraft part is received from the manufacturer, as shown at blocks 616 and 618. As received, the replacement aircraft part is manufactured in compliance with the regulations and certified. And the aircraft part is replaced with the replacement aircraft part on the aircraft, as shown at block 620.

In some examples, determining the demand for the replacement aircraft part at block 602 includes accessing first, second and third time series of observations of first, second and third variables, as shown at block 622 of FIG. 6B. The first time series of observations of the first variables describe in-service operation of the aircraft. The second time series of observations of the second variables describe maintenance of the aircraft. The third time series of observations of the third variables describe at least one of weather or terrain in an environment of the aircraft during the in-service operation and the maintenance of the aircraft.

In some of the above examples, the aircraft is from a plurality of aircraft of a type of aircraft, and determining the demand for the replacement aircraft part at block 602 also includes determining a behavior model of the type of aircraft that is trained to predict the demand for the replacement aircraft part from a training set of observations the first variables, the second variables and the third variables across the plurality of aircraft of the type of aircraft, as shown at block 624. Again, the behavior model is implemented as a DAG of machine learning models that are connected to one another, with an output of a first of the machine learning models fed to as input to a second of the machine learning models. And in some examples, the first time series, the second time series and the third time series are applied to the behavior model to predict the demand for the replacement aircraft part, as shown at block 626.

According to example implementations of the present disclosure, the systems 200, 300 and their respective subsystems including the source 202, aircraft parts maintenance engine 210, aircraft parts acquisition engine 302 and/or manufacturer computer 308 may be implemented by various means. Means for implementing the systems and their respective subsystems may include hardware, alone or under direction of one or more computer programs from a computer-readable storage medium. In some examples, one or more apparatuses may be configured to function as or otherwise implement the systems and their respective subsystems shown and described herein. In examples involving more than one apparatus, the respective apparatuses may be connected to or otherwise in communication with one another in a number of different manners, such as directly or indirectly via a wired or wireless network or the like.

Figure 7:
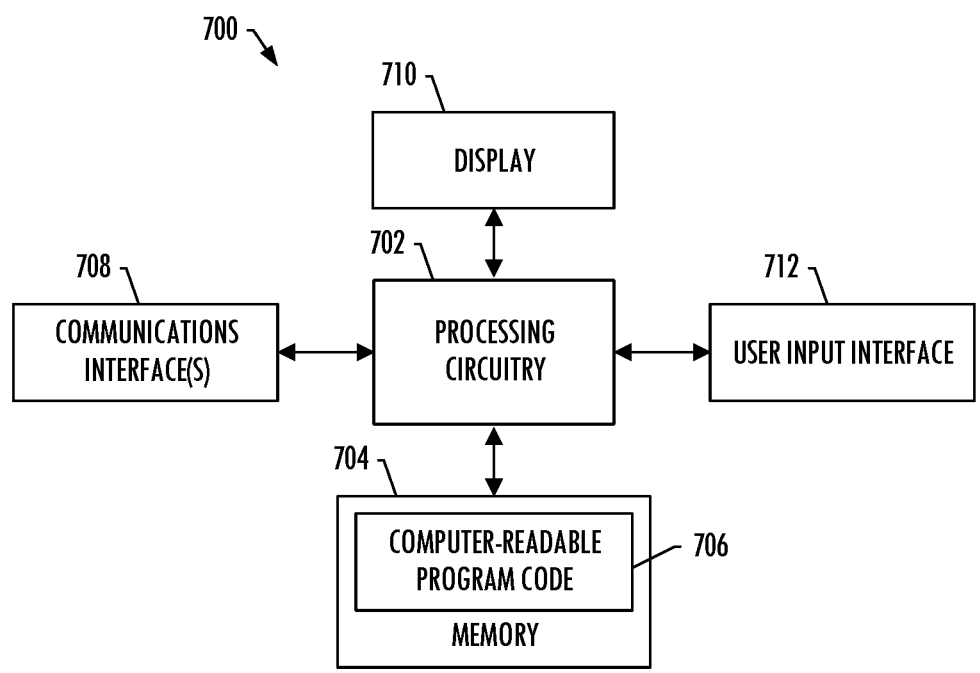
FIG. 7 illustrates an apparatus according to some example implementations.

FIG. 7 illustrates an apparatus 700 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 702 (e.g., processor unit) connected to a memory 704 (e.g., storage device).

The processing circuitry 702 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 704 (of the same or another apparatus).

The processing circuitry 702 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processing circuitry 702 may also be connected to one or more interfaces for displaying, transmitting and/or receiving information. The interfaces may include a communications interface 708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 710 and/or one or more user input interfaces 712 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 700 may include a processing circuitry 702 and a computer-readable storage medium or memory 704 coupled to the processing circuitry, where the processing circuitry is configured to execute computer-readable program code 706 stored in the memory. It will also be understood that one or more functions, and combinations of functions, may be implemented by special purpose hardware-based computer systems and/or processing circuitry which perform the specified functions, or combinations of special purpose hardware and program code instructions.

Figure 8:
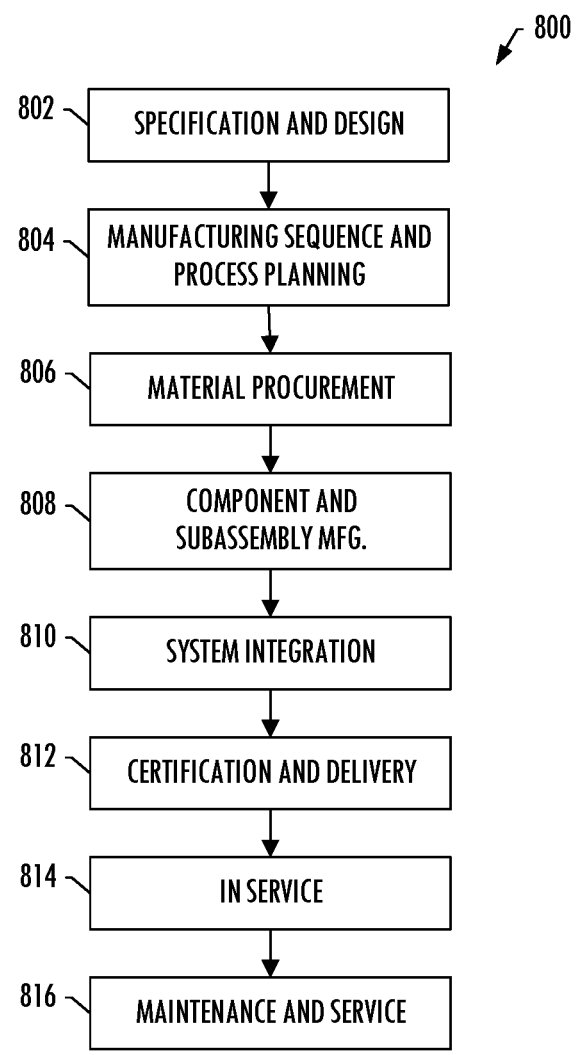
FIG. 8 is an illustration of a flow diagram of aircraft production and service methodology according to one example implementation.

As explained above, example implementations of the present disclosure may be suitable for maintaining an aircraft or other suitable vehicle such as a spacecraft, watercraft, motor vehicle, railed vehicle and the like. Thus, referring now to FIG. 8, example implementations may be used in the context of an aircraft manufacturing and service method 800. During pre-production, the example method may include specification and design 802 of an aircraft such as aircraft 100, manufacturing sequence and processing planning 804 and material procurement 806. During production, component and subassembly manufacturing 808 and system integration 810 of the aircraft takes place. Thereafter, the aircraft may go through certification and delivery 812 in order to be placed in service 814. While in service by an operator, the aircraft may be scheduled for maintenance and service 816 (which may also include modification, reconfiguration, refurbishment or the like).

Aspects of example implementations of the present disclosure may be implemented throughout the aircraft manufacturing and service method 800. Observations of the first, second and third variables may be collected or otherwise accessed throughout, most notably during in-service operation 814, and maintenance and service 816. The demand for replacement parts may be predicted, and plans may be created and executed, during in-service operation and maintenance of the aircraft.

Each of the processes of the example method 800 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for maintaining an aircraft from a plurality of aircraft of a type of aircraft that includes a plurality of aircraft parts, the system comprising:
   at least one source of data including at least one series of observations related to the aircraft; and
   an electronic device in communication with the at least one source of data, the electronic device including:
      a memory configured to store computer-readable program code; and
      processing circuitry configured to access the memory, and execute the computer-readable program code to cause the electronic device to at least:
         access a first time series of observations of first variables that describe in-service operation of the aircraft, including for a plurality of flights of the aircraft, flight plans, and geographic locations, operational context and status of the aircraft;
         access a second time series of observations of second variables that describe maintenance of the aircraft, including a maintenance history of the aircraft, historical orders of replacement aircraft parts for respective aircraft parts of the plurality of aircraft parts, and historical time to replace the respective aircraft parts with the replacement aircraft parts;
         access a third time series of observations of third variables that describe at least one of weather or terrain in an environment of the aircraft during the in-service operation and the maintenance of the aircraft;
         determine a behavior model of the type of aircraft that is trained to predict demand for the replacement aircraft parts from a training set of observations of the first variables, the second variables and the third variables across the plurality of aircraft of the type of aircraft, the behavior model implemented as a directed acyclic graph of machine learning models that are connected to one another, an output of a first of the machine learning models fed as input to a second of the machine learning models;
         apply the first time series, the second time series and, the third time series to the behavior model to predict the demand for the replacement aircraft parts;
         create a plan for acquisition of the replacement aircraft parts, and maintenance of the aircraft in which the respective aircraft parts are replaced with the replacement aircraft parts, based on the demand as predicted; and
         execute the plan to maintain the aircraft.

2. The system of claim 1, wherein the operational context of the aircraft for a flight of the aircraft is defined by one or more of the first variables that characterize a situation of the aircraft during the flight, including a type of the flight as a solo flight or a coordinated flight with multiple aircraft, and when the flight is the coordinated flight, a position of the aircraft in a formation of the multiple aircraft.

3. The system of claim 1, wherein the operational context of the aircraft for a flight of the aircraft is defined by one or more of the first variables that characterize a situation of the aircraft during the flight, including a use of flight controls to operate the aircraft during the flight, and a use of aircraft systems driven by the use of the flight controls.

4. The system of claim 1, wherein the processing circuitry is configured to execute the computer-readable program code to cause the electronic device to further at least:
store the first time series, the second time series and the third time series in one or more data stores continuously and contemporaneous with the in-service operation and the maintenance of the aircraft, the one or more data stores including one or more of a time-series data warehouse, an object storage system, a document storage system, a distributed file system, a disk file system, a distributed data storage, or a database management system, and
wherein the first time series, the second time series, and the third time series are accessed from the one or more data stores.

5. The system of claim 4, wherein the electronic device caused to store one or more of the first time series, the second time series, or the third time series includes the electronic device caused to at least:
digitize printed documents to produce corresponding electronic documents;
extract data from the corresponding electronic documents; and
format the data into observations of one or more of the first time series, the second time series, or the third time series.

6. The system of claim 1, wherein the behavior model is determined from the training set of the observations of the first variables, the second variables, and the third variables across the plurality of aircraft of the type of aircraft, and further across a plurality of types of aircraft.

7. The system of claim 1, wherein the electronic device caused to create the plan includes the electronic device caused to at least:
determine the replacement aircraft part is an out-of-stock part or an out-of-production part; and
identify the replacement aircraft part as a make-to-order part; and
identify a manufacturer for the replacement aircraft part, wherein the electronic device caused to execute the plan includes the electronic device caused to place an automated order for the replacement aircraft part from the manufacturer.

8. The system of claim 1, wherein the electronic device caused to execute the plan includes the electronic device caused to at least:
collect additional observations of the first variables, the second variables, and the third variables; and
feed the additional observations of the first variables, the second variables, and the third variables back to the training set to further train the behavior model.

9. A system for automated acquisition of a replacement aircraft part to replace an aircraft part of an aircraft, the system comprising:
at least one source of data including at least one series of observations related to the aircraft; and
an electronic device in communication with the at least one source of data, the electronic device including:
a memory configured to store computer-readable program code; and
processing circuitry configured to access the memory, and execute the computer-readable program code to cause the electronic device to at least:
determine a demand for the replacement aircraft part based on the at least one series of observations related to the aircraft;
determine the replacement aircraft part is an out-of-stock part or an out-of-production part;
determine the replacement aircraft part is manufacturable as a make-to-order part in compliance with regulations to which the aircraft is subject, and that is certifiable for use on the aircraft;
identify a plurality of manufacturers authorized to manufacture and certify the replacement aircraft part;
submit a request for proposal for the replacement aircraft part to the plurality of manufacturers;
receive responses to the request for proposal from the plurality of manufacturers;
identify a manufacturer for the replacement aircraft part based on the responses; and
place an automated order for the replacement aircraft part from the manufacturer.

10. The system of claim 9, wherein the aircraft is from a plurality of aircraft of a type of aircraft, and the electronic device caused to at least:
access a first time series of observations of first variables that describe in-service operation of the aircraft, a second time series of observations of second variables that describe maintenance of the aircraft, and a third time series of observations of third variables that describe at least one of weather or terrain in an environment of the aircraft during the in-service operation and the maintenance of the aircraft;
determine a behavior model of the type of aircraft that is trained to predict the demand for the replacement aircraft part from a training set of observations of the first variables, the second variables and the third variables across the plurality of aircraft of the type of aircraft, the behavior model implemented as a directed acyclic graph of machine learning models that are connected to one another, an output of a first of the machine learning models fed as input to a second of the machine learning models; and
apply the first time series, the second time series, and the third time series to the behavior model to predict the demand for the replacement aircraft part.

11. A method of maintaining an aircraft from a plurality of aircraft of a type of aircraft that includes a plurality of aircraft parts, the method comprising:
receiving, via processing circuitry of an electronic device, at least one series of observations related to the aircraft from at least one source of data in communication with the electronic device;
accessing, via the processing circuitry of the electronic device, a first time series of observations of first variables that describe in-service operation of the aircraft, including for a plurality of flights of the aircraft, flight plans, and geographic locations, operational context and status of the aircraft;
accessing, via the processing circuitry of the electronic device, a second time series of observations of second variables that describe maintenance of the aircraft, including a maintenance history of the aircraft, historical orders of replacement aircraft parts for respective aircraft parts of the plurality of aircraft parts, and historical time to replace the respective aircraft parts with the replacement aircraft parts;
accessing, via the processing circuitry of the electronic device, a third time series of observations of third variables that describe at least one of weather or terrain in an environment of the aircraft during the in-service operation and the maintenance of the aircraft;

determining, via the processing circuitry of the electronic device, a behavior model of the type of aircraft that is trained to predict demand for the replacement aircraft parts from a training set of observations the first variables, the second variables, and the third variables across the plurality of aircraft of the type of aircraft, the behavior model implemented as a directed acyclic graph of machine learning models that are connected to one another, an output of a first of the machine learning models fed to as input to a second of the machine learning models;

applying, via the processing circuitry of the electronic device, the first time series, the second time series and the third time series to the behavior model to predict the demand for the replacement aircraft parts;

creating, via the processing circuitry of the electronic device, a plan for acquisition of the replacement aircraft parts, and maintenance of the aircraft in which the respective aircraft parts are replaced with the replacement aircraft parts, based on the demand as predicted; and executing the plan, created via the processing circuitry of the electronic device, to maintain the aircraft.

12. The method of claim 11, wherein the operational context of the aircraft for a flight of the aircraft is defined by one or more of the first variables that characterize a situation of the aircraft during the flight, including a type of the flight as a solo flight or a coordinated flight with multiple aircraft, and when the flight is the coordinated flight, a position of the aircraft in a formation of the multiple aircraft.

13. The method of claim 11, wherein the operational context of the aircraft for a flight of the aircraft is defined by one or more of the first variables that characterize a situation of the aircraft during the flight, including a use of flight controls to operate the aircraft during the flight, and a use of aircraft systems driven by the use of the flight controls.

14. The method of claim 11 further comprising:
storing, via the processing circuitry of the electronic device, the first time series, the second time series and the third time series in one or more data stores continuously and contemporaneous with the in-service operation and the maintenance of the aircraft, the one or more data stores including one or more of a time-series data warehouse, an object storage system, a document storage system, a distributed file system, a disk file system, a distributed data storage, or a database management system, and
wherein the first time series, the second time series, and the third time series are accessed from the one or more data stores.

15. The method of claim 14, wherein storing one or more of the first time series, the second time series, or the third time series includes:
digitizing printed documents to produce corresponding electronic documents;
extracting data from the corresponding electronic documents; and
formatting the data into observations of one or more of the first time series, the second time series, or the third time series.

16. The method of claim 11, wherein the behavior model is determined from the training set of the observations of the first variables, the second variables, and the third variables across the plurality of aircraft of the type of aircraft, and further across a plurality of types of aircraft.

17. The method of claim 11, wherein creating the plan for acquisition of the replacement aircraft parts:
determining the replacement aircraft part is an out-of-stock part or an out-of-production part; and
identifying the replacement aircraft part as a make-to-order part; and
identifying a manufacturer for the identified replacement aircraft part,
wherein executing the plan includes placing an automated order for the identified replacement aircraft part from the identified manufacturer.

18. The method of claim 11, wherein executing the plan includes:
collecting additional observations of the first variables, the second variables and the third variables; and
feeding the additional observations of the first variables, the second variables and the third variables back to the training set to further train the behavior model.

19. A method of automated acquisition of a replacement aircraft part to replace an aircraft part of an aircraft, the method implemented by a computer and comprising:
receiving, via processing circuitry of an electronic device, at least one series of observations related to the aircraft; and
determining, via the processing circuitry of the electronic device, a demand for the replacement aircraft part based upon the at least one series of observations received by the processing circuitry of the electronic device;
determining, via the processing circuitry of the electronic device, the replacement aircraft part is an out-of-stock part or an out-of-production part;
determining, via the processing circuitry of the electronic device, the replacement aircraft part is manufacturable as a make-to-order part in compliance with regulations to which the aircraft is subject, and that is certifiable for use on the aircraft;
identifying, via the processing circuitry of the electronic device, a plurality of manufacturers authorized to manufacture and certify the replacement aircraft part;
submitting, via the processing circuitry of the electronic device, a request for proposal for the replacement aircraft part to the plurality of manufacturers;
receiving, via the processing circuitry of the electronic device, responses to the request for proposal from the plurality of manufacturers;
identifying, via the processing circuitry of the electronic device, a manufacturer for the replacement aircraft part based on the responses;
placing, via the processing circuitry of the electronic device, an automated order for the replacement aircraft part from the manufacturer;
receiving, via the processing circuitry of the electronic device, the replacement aircraft part from the manufacturer, the replacement aircraft part manufactured in compliance with the regulations and certified; and
replacing the aircraft part on the aircraft with the replacement aircraft part received from the manufacturer.

20. The method of claim 19, wherein the aircraft is from a plurality of aircraft of a type of aircraft, and determining the demand for the replacement aircraft part includes:
accessing, via the processing circuitry of the electronic device, a first time series of observations of first variables that describe in-service operation of the aircraft, a second time series of observations of second variables that describe maintenance of the aircraft, and a third time series of observations of third variables that describe at least one of weather or terrain in an environment of the aircraft during the in-service operation and the maintenance of the aircraft;

determining, via the processing circuitry of the electronic device, a behavior model of the type of aircraft that is trained to predict the demand for the replacement aircraft part from a training set of observations the first variables, the second variables, and the third variables across the plurality of aircraft of the type of aircraft, the behavior model implemented as a directed acyclic graph of machine learning models that are connected to one another, an output of a first of the machine learning models fed as input to a second of the machine learning models; and applying, via the processing circuitry of the electronic device, the first time series, the second time series and the third time series to the behavior model to predict the demand for the replacement aircraft part.

\* \* \* \* \*